United States Patent
Ohmori et al.

[11] Patent Number: 5,945,796
[45] Date of Patent: Aug. 31, 1999

[54] POWER WINDOW CONTROL APPARATUS

[75] Inventors: Yoshiharu Ohmori; Masaki Tamura, both of Kanagawa-ken, Japan

[73] Assignee: Nissan Motor Co., Ltd., Kanagawa, Japan

[21] Appl. No.: 09/085,167

[22] Filed: May 28, 1998

[30] Foreign Application Priority Data

May 28, 1997 [JP] Japan ................................ 9-138814

[51] Int. Cl.$^6$ ................ B60J 1/17; G05B 9/02
[52] U.S. Cl. .................. 318/266; 318/630; 318/632; 318/469
[58] Field of Search ................. 318/618, 626, 318/630, 632, 264, 265, 266, 286, 466, 468, 469, 470

[56] References Cited

U.S. PATENT DOCUMENTS

| | | | |
|---|---|---|---|
| 5,404,673 | 4/1995 | Takeda et al. | 49/28 |
| 5,436,539 | 7/1995 | Wrenbeck et al. | 318/265 |
| 5,705,755 | 1/1998 | Yamamura | 73/862.191 |

FOREIGN PATENT DOCUMENTS 5-095694  4/1993  Japan.

*Primary Examiner*—Bentsu Ro
*Attorney, Agent, or Firm*—McDermott, Will & Emery

[57] ABSTRACT

Disclosed is a power window control apparatus which is enhanced in the precision of judging when a foreign matter is caught by a vehicle window in its closing stroke, and is capable of preventing detection errors when the foreign matter is caught by. Such apparatus comprises a first gear for transmitting rotation of a motor, a second gear for driving up or down the vehicle window, an encoder for converting the rotational angle of the motor into a pulse signal, calculating section for canceling fluctuations of the pulse signal due to engagement of the first and second gears, and calculating the frequency value of the pulse signal, and judging section for judging that a foreign matter is caught by the vehicle window when the frequency value calculated by the calculating means is equal to or exceeds a specified reference value.

7 Claims, 8 Drawing Sheets

(OPENED) ← N → (CLOSED)

POWER WINDOW CONTROL APPARATUS

BACKGROUND OF THE INVENTION

1. Field of the Invention

The present invention relates to a power window control apparatus, and more particularly to a power window control apparatus preferably used in a vehicle, enhanced in precision of judging a foreign matter even if the foreign matter is caught by the vehicle window when driving to close the vehicle window of the vehicle.

2. Description of the Related Art

As a conventional power window apparatus, an opening and closing apparatus for vehicle disclosed in Japanese Patent Application Laid-open No. 5-95694 is known.

In this conventional apparatus, when driving a motor to raise or lower a vehicle window, a rotational angle of the motor is converted into a pulse signal by using an encoder, and the degree of opening of the vehicle window is detected by using a counting value of the pulse signal.

In this apparatus, for the pulse signal issued from the encoder while driving the motor, if the difference of pulse width between the previous value and present value is within a specified reference range over plural times consecutively, it is judged that a foreign matter is caught by the vehicle window. When thus judged, the ascending drive of the vehicle window is changed to descending drive, that is, it is controlled to drive by inverting the move of the vehicle window.

In this apparatus, therefore, if a foreign matter is caught by the vehicle window, it can be taken out immediately.

In this conventional apparatus, however, when driving the vehicle window, a load was applied to the engagement portions between the pinion gear for transmitting rotation of the motor and the sector gear for rotating the main arm for driving to move up or down the vehicle window.

As a result, fluctuated variation occur in the pulse width of the pulse signal issued from the encoder.

Or when the vehicle runs a rough road, vibrations due to rough road are further added to the engagement parts of the pinion gear and sector gear, and extreme fluctuations may occur in the pulse width of pulse signal issued from the encoder.

Consequently, although foreign matter is not caught in, it may be falsely judged that foreign matter has been caught in.

Moreover, if the difference is calculated by subtracting the present value from the previous value of the pulse width of pulse signal issued from the encoder, the fluctuated variation occurring in the pulse width cannot be erased, and taking such fluctuated value into consideration, it is necessary to set relatively wide the specified reference range about the difference of the previous value and present value of the pulse width for judging occurrence of foreign matter that is caught by the vehicle window.

As a result, it takes a time until it is actually detected from the time foreign matter is actually caught by, and hence the load applied to the motor is increased.

SUMMARY OF THE INVENTION

It is therefore an object of the present invention to provide a power window control apparatus capable of enhancing the precision of judgement in the case that the foreign matter is caught by the vehicle window when driving to close the vehicle window, and preventing detection error when detecting of the foreign matter caught by.

That is, the invention relates to a power window control apparatus for controlling ascending and descending drive of an opening and closing body, representatively a vehicle window, comprising a first gear for transmitting rotation of motor, a second gear provided for driving to move up or down the opening and closing body, an encoder for converting a rotational angle of the motor into a pulse signal, calculating means for calculating the frequency value of the pulse signal by canceling fluctuations of pulse signal caused by engagement of the first and second gears, and judging means for judging that a foreign matter is caught by the opening and closing body when the frequency value calculated by the calculating means is equal to or exceeds a specified reference.

In such constitution, since fluctuated variation of the pulse signal are securely canceled, judging errors of the foreign matter caught by are efficiently eliminated, and the judging precision is enhanced.

Herein, to cancel pulse signal fluctuations, preferably, the calculating means should calculate the frequency value of the pulse signal by subtracting the present frequency of the pulse signal from the frequency of the pulse signal previous to the present frequency by the portion of one period of engagement of the first gear and the second gear.

That is, the present invention is devised by acknowledging that it is extremely effective to subtract the present frequency of the pulse signal from the frequency of the pulse signal previous to the present frequency by the portion of one period of engagement of the first and second gears, for canceling fluctuations of pulse signal.

For further enhancement of reliability of judgment, preferably, the calculating means should calculate plural frequency values by combining plural calculation formulas differing in each reference period to the frequency of pulse signal output from the encoder, and the judging means should judge that foreign matter is caught by the opening and closing body when judgment formulas corresponding to the plural frequency values are established at the same time.

Herein, more specifically, the power window control apparatus of the present invention comprises an arm member supported rotatably, with one end linked to the opening and closing body, and the second gear is a second gear coupled to the other end of such arm member.

Such arm member is not specified in shape, whether X-shape or I-shape, for example, as far as the member can transmit the driving force sent from the motor through the first gear and second gear securely to the opening and closing body.

And, in other words, the calculating means of the power window control apparatus of the invention includes a noise canceler.

Specifically, the noise canceler is designed to cancel the noise attributable to load fluctuations caused by engagement of the first gear and second gear, by calculating the frequency by subtracting the present frequency of the pulse signal from the frequency of the pulse signal previous to the present frequency by the portion of one period of engagement of the first gear and second gear.

The noise canceler can further calculate the frequency value of the pulse signal by subtracting the frequency of the pulse signal having the reference period different from the present frequency, from the frequency of the pulse signal previous to the frequency of the pulse signal having the reference period different from the present frequency by the portion of one period of engagement of the first gear and the second gear.

In such a case, the judging means combined plural judging formulas on the basis of the frequency values calculated by subtracting by mutually varying the reference period, and can judge that a foreign matter is caught by the opening and closing body, and therefore the judging precision of the foreign matter caught by is enhanced, and the judgement becomes much surer.

DETAILED DESCRIPTION OF THE PREFERRED EMBODIMENT

Figure 1:
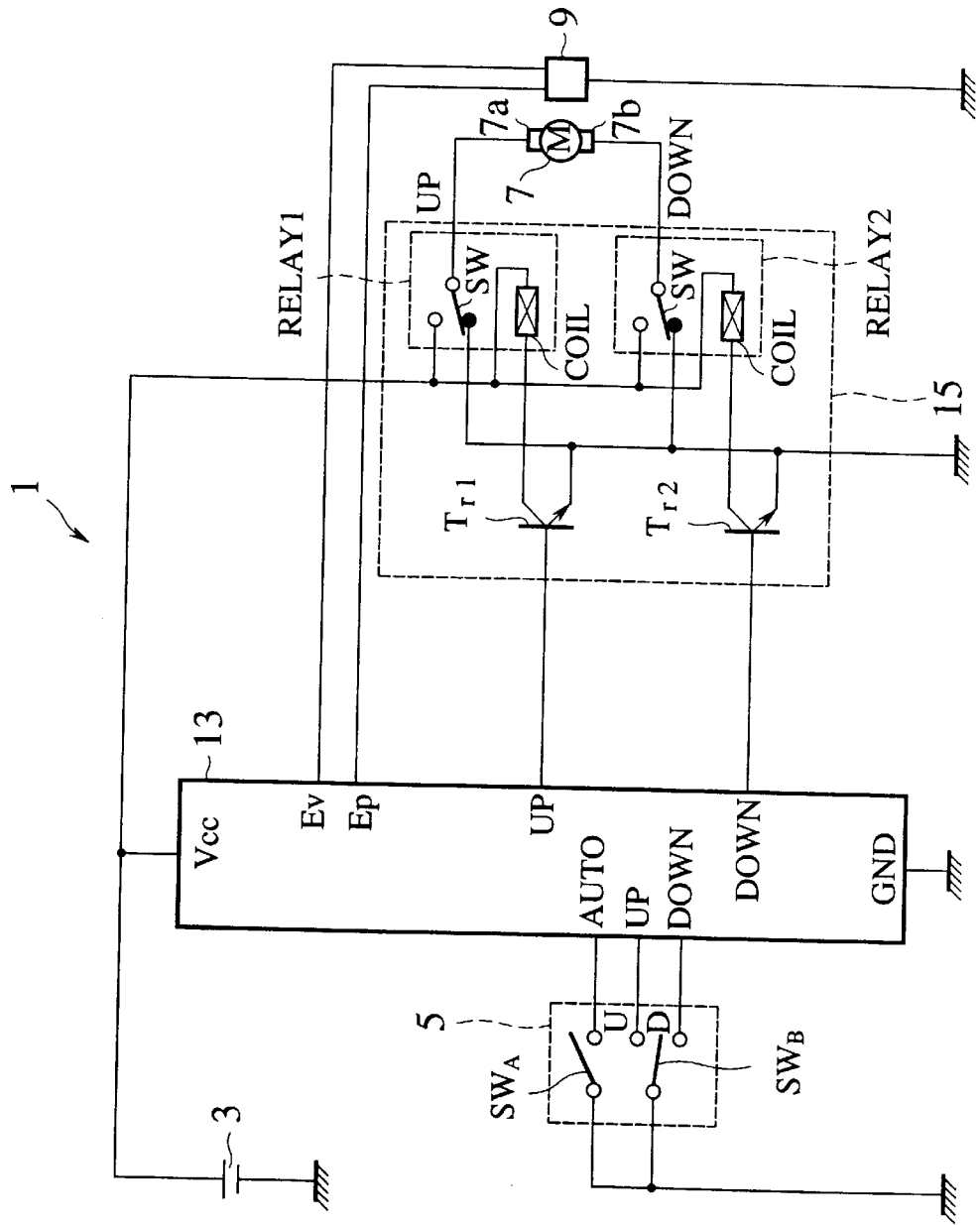
FIG. 1 is a diagram showing a system configuration of a vehicle power window control apparatus in an embodiment of the invention.

Referring now to the drawings, an embodiment of the invention is specifically described below.

FIG. 1 is a diagram showing a system configuration of a vehicle power window control apparatus 1 in an embodiment of the invention.

As shown in FIG. 1, a vehicle power window control apparatus 1 comprises a battery 3 for supplying a power source to the apparatus, a main switch 5 for feeding an operation signal for driving the vehicle window in ascending motion or descending motion, a regulator motor 7 for driving the vehicle window up or down, an encoder 9 for converting the rotational angle of the regulator motor 7 into a pulse signal, a CPU 13 for controlling an opening and closing control signal to be issued to a changeover circuit 15 depending on the operation signal from the main switch 5 or pulse signal from the encoder 9, and the changeover circuit 15 for changing over the current direction to be supplied to the motor 9 depending on the vehicle window opening and closing control signal from the CPU 13.

The main switch 5 shown in FIG. 1 is composed of switch SWA and switch SWB in integral structure. Herein, the switch SWA is a switch having a so-called one-touch mechanism for automatically continuing driving of the vehicle window until ascending or descending of the vehicle window is over, if the hand is released from the switch, in the case that the switch is manipulated over a specified angle. On the other hand, the switch SWB is a switch for moving up or down the vehicle window only while the switch is being pressed.

More specifically, for example, when the main switch 5 is pushed forward, first, a contact D of the switch SWB is closed, and the vehicle window begins to descend, and when pushed further forward, the switch SWA is closed. At this time, if the hand is released, the descending motion of the vehicle window continues.

On the other hand, when the main switch 5 is pulled backward, first, a contact U of the switch SWB is closed, and the vehicle window begins to ascend, and when pulled further backward, the switch SWA is closed. At this time, if the hand is released, the ascending motion of the vehicle window continues.

The changeover circuit 15 shown in FIG. 1 comprises a transistor Tr1 which is turned on depending on the close control signal of high level issued from the CPU 13, a relay 1 for changing over the contact from the ground side to the power source side by exciting a coil when the transistor Tr1 is turned on, a transistor Tr2 which is turned on depending on the open control signal of high level issued from the CPU 13, and a relay 2 for changing over the contact from the ground side to the power source side by exciting a coil when the transistor Tr2 is turned on.

In thus constituted vehicle power window control apparatus 1, the case of continuously and upward moving the vehicle window is explained.

First, when the contact U of the switch SWB is closed by the vehicle driver, and further the switch SWA is closed, the CPU 13 judges to be operation for raising the vehicle window continuously, and issues a close control signal of high level to the transistor Tr1.

Consequently, the transistor Tr1 is turned on according to the close control signal of high level to excite the coil of the relay 1, and changes over the switch of the relay 1 from the ground side to the power source side.

As a result, the current from the battery 3 flows into one end 7a of the regulator motor 7 through the switch contact of the relay 1, and is connected to the ground through the switch contact of the relay 2 from other end 7b of the regulator motor 7.

Figure 2:
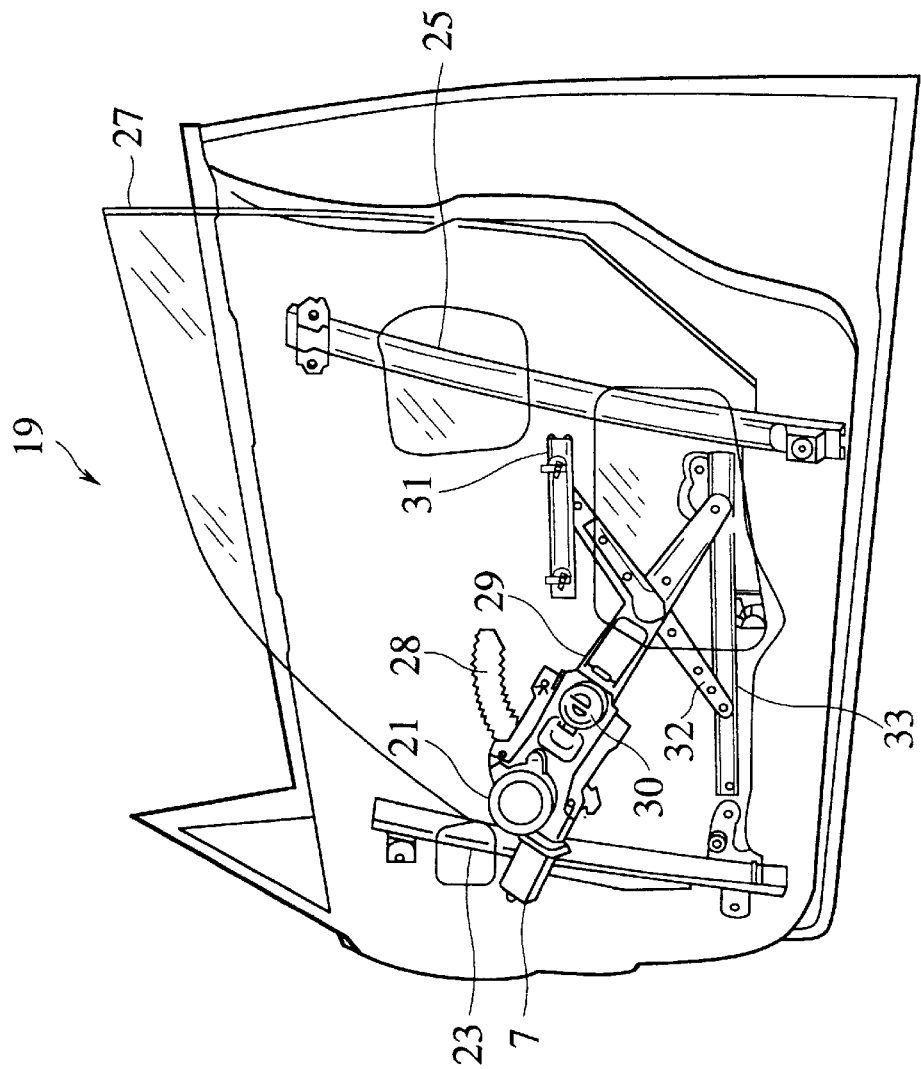
FIG. 2 is a diagram showing the constitution of mechanism of X-arm system of the same apparatus.

Accordingly, a driving current flow in the regulator motor 7 from terminal 7a to terminal 7b, and the vehicle window is changed from the fully opened stage to the ascending state, so that the vehicle window 2 shown in FIG. 2 begins to ascend from down to up.

FIG. 2 is a diagram showing a constitution of an X-arm system mechanism as an example of vehicle power window control apparatus 1.

The regulator motor 7 shown in FIG. 2 is installed, for example, in a door inner panel, not shown, in a front door 19, and drives up or down a vehicle window 27 being guided by a front guide rail 23 and a guide channel 25 depending on the rotation of the regulator motor 7.

More specifically, a main arm 29 mounting a sector gear 28 is rotated about a rotational axis 30, depending on rotation of a pinion gear 21 installed in a gear case 41 described later and connected to the regulator motor 7 fixed in the door inner panel.

As a result, the lower end of a sub-arm 32 slides as being guided by a main channel 33, and the vehicle window 27 is raised or lowered while being held nearly parallel by the parallel mechanism formed by a sub-channel 31 and main channel 33.

Figure 3A:
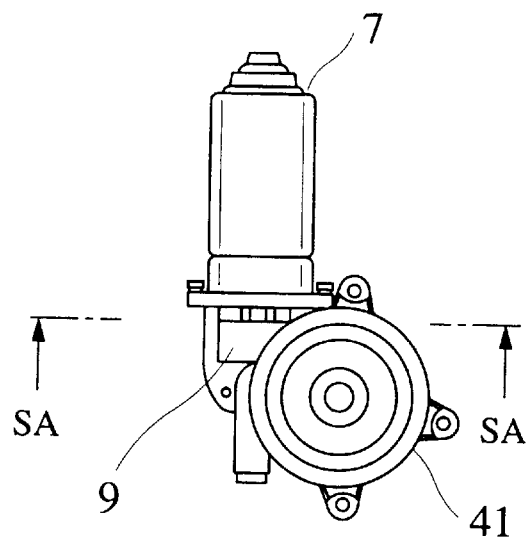
FIG. 3A is a schematic appearance drawing of a regulator motor mounting an encoder of the apparatus, and a gear case incorporating a pinion gear and others coupled with the regulator motor.
Figure 3B:
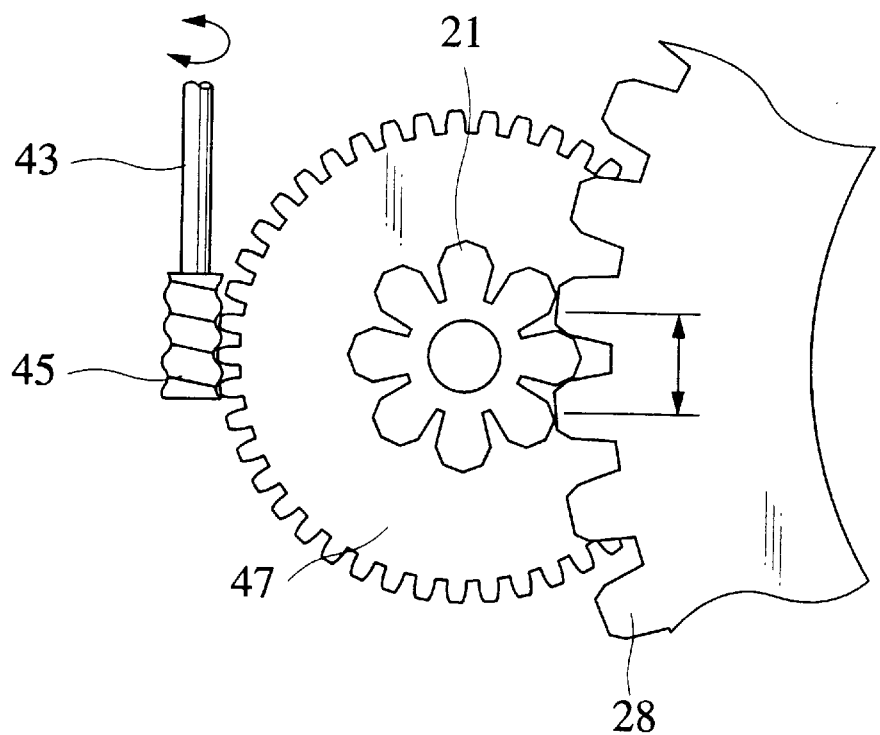
FIG. 3B is a detailed structural drawing of inside of gear case showing the internal structure of FIG. 3A, particularly showing the coupled state of regular motor and pinion gear and others.

Herein, referring to FIG. 3A and 3B, the manner of transmission of regulator 7 to the sector gear 28 is explained.

FIG. 3A shows a schematic configuration of the regulator motor 7 mounting the encoder 9 and the gear case 41 incorporating the pinion gear 21 and others coupled with the regulator motor 7.

FIG. 3B shows the principal structure of FIG. 3A, being a detailed structural diagram, inside the gear case 41, coupling the regulator motor 7 and pinion gear 21 and others.

As shown in FIG. 3B, a worm gear 45 is provided at the leading end of an armature shaft 43 of the regulator motor 7. When the armature shaft 43 of the regulator motor 7 rotates, its rotation is transmitted to a worm wheel 47 in the gear case 41 by the worm gear 45 provided at the leading end of the armature shaft 43, and is further transmitted to the pinion gear 21 fixed on the same rotational axis as the worm wheel 47.

The rotation thus transmitted to the pinion gear 21 is transmitted to the sector gear 28 engaged with the pinion gear 21, and, as a result, the vehicle window 27 is driven up or down depending on the rotation of the regulator motor 7 as mentioned above.

Herein, one period of engagement of the pinion gear 21 and sector gear 28 corresponds to one engagement of corresponding teeth of these gears 21, 28 as indicated by both arrows in FIG. 3B.

Figure 4A:
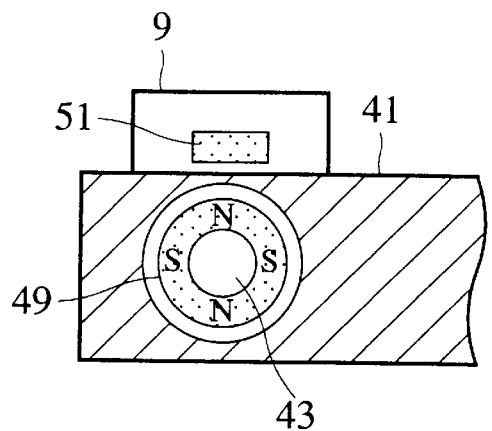
FIG. 4A is a sectional view cut along line SA—SA orthogonally crossing the armature shaft of the regulator motor shown in FIG. 3A.
Figure 4B:
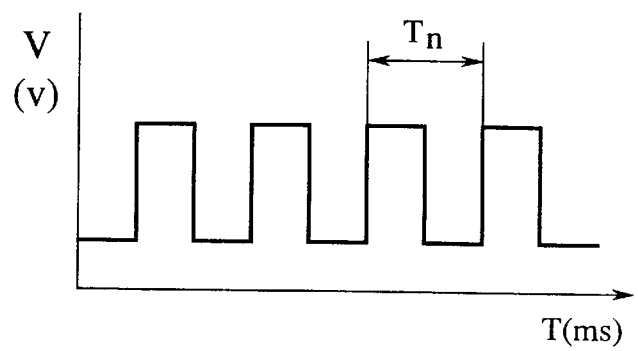
FIG. 4B shows a pulse signal output from the encoder shown in FIGS. 1 and 3A.

Referring then to FIG. 4A and FIG. 4B, the operation of the encoder 9 mounted on the regulator motor 7 is described below.

As shown in FIG. 4A showing a section cut off along line SA—SA orthogonal to the armature shaft 43 of the regulator motor 7 in FIG. 3A, the encoder 9 is provided at the side of the gear case 41, and the encoder 9 has a Hall IC 51.

On the other hand, a doughnut-shaped magnet 49 is provided on the armature shaft 43 of the regulator motor 7, and it rotates at the side surface of the Hall IC 51 while alternately changing the magnetic poles N and S, depending on the rotation of the armature shaft 43 of the regulator motor 7.

As a result, as shown in FIG. 4B, pulse signal having pulse width T are sequentially issued from the encoder 9. In this FIG. 4B, $T_n$ is representatively described.

Figure 5:
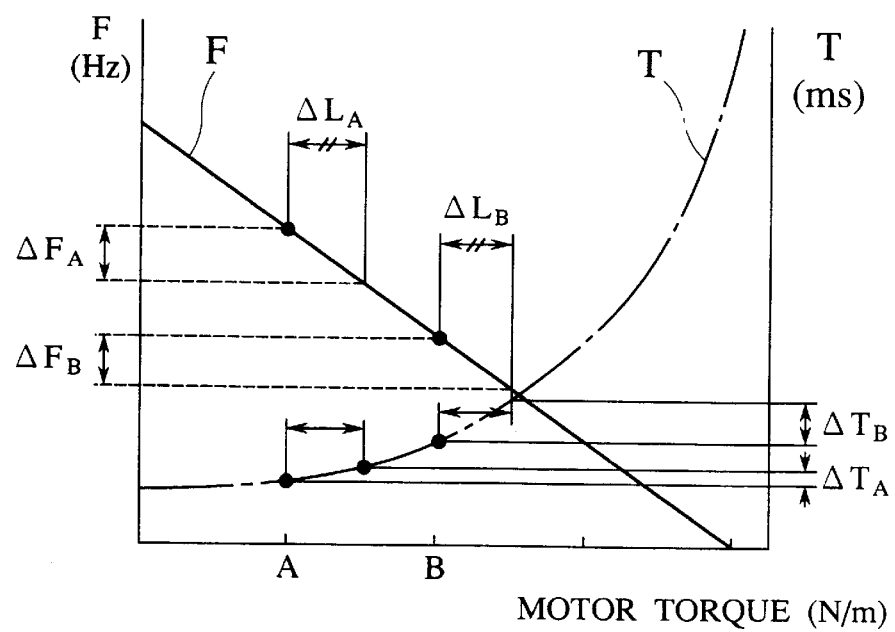
FIG. 5 is an explanatory diagram of the relation of motor torque, pulse width T, and pulse frequency F of pulse signal issued from the encoder.

Herein, referring to FIG. 5, the relation of pulse width T and pulse frequency F of pulse signal issued from the encoder 9, and motor torque is explained. The pulse width T and pulse frequency F of pulse signal are in the relation of T=1/F.

First, there is a proportional relation between the load applied to the regulator motor 7 and the rotation of the regulator motor 7.

Hence, as shown in FIG. 5, the pulse frequency F of the pulse signal issued from the encoder 9 is in a proportional relation with the load applied to the regulator motor 7 during ascending or descending drive of the vehicle window, that is, the motor torque, and more specifically in an inverse proportional relation.

Supposing the load applied to the regulator motor 7 to be value A, for example, dislocation $\Delta L_A$ of the load (motor torque) for detecting the "foreign matter caught" state when a foreign matter is caught, and dislocation $\Delta L_B$ of the load for detecting the "foreign matter caught" state when a foreign matter is caught in the case of value B different from value A are desired to be same variation width, in principle, in consideration of the durability of the regulator motor 7 and the like.

However, by setting $\Delta L_A$ and $\Delta L_B$ equally, if attempted to detect the "foreign matter caught" from the dislocation of the pulse width T, as shown in FIG. 5, since the pulse width T is not in proportional relation with the load, the dislocation $\Delta T_A$ of pulse width corresponding to $\Delta L_A$ and the dislocation $\Delta T_B$ of pulse width corresponding to $\Delta L_B$ (=$\Delta L_A$) and not equal, but $\Delta T_A$ is larger than $\Delta T_B$, and the "foreign matter caught" is detected from the dislocation of different pulse width corresponding to the value of the load.

In this case, for example, if the threshold of judging "foreign matter caught" in detection process of the "foreign matter caught" is, for example, set commonly at $\Delta T_A$, during ascending or descending drive by the load of value B, since $\Delta T_A$ is smaller than $\Delta T_B$, "foreign matter caught" state may be detected easily.

Therefore, in the case of detection process of the "foreign matter caught" by using the pulse width T of pulse signal issued from the encoder 9, the threshold of dislocation of pulse width T must be varied depending on the change of load, and hence it is necessary to vary the threshold and judge "the foreign matter caught", which results in complicated process.

By contrast, as for the pulse frequency F of the pulse signal issued from the encoder 9, supposing the dislocation at value A of pulse frequency to be $\Delta F_A$ and the dislocation at value B of pulse frequency to be $\Delta F_B$, since their relation is $\Delta F_A = \Delta F_B$, regardless of changes of the load of regulator motor 7, the "foreign matter caught" state can be detected by a constant threshold.

In the embodiment, accordingly, foreign matter caught detection is processed by making use of the characteristic that the dislocation of pulse frequency F of pulse signal issued from the encoder 9 is always the same value regardless of the load value applied to the regulator motor 7.

Incidentally, the load applied to the regulator motor 7 during ascending or descending drive of the vehicle window is not actually constant, but it must be noted that it varies depending on the variations of the temperature condition or sliding resistance of a vehicle window and a sash, etc.

Figure 6A:
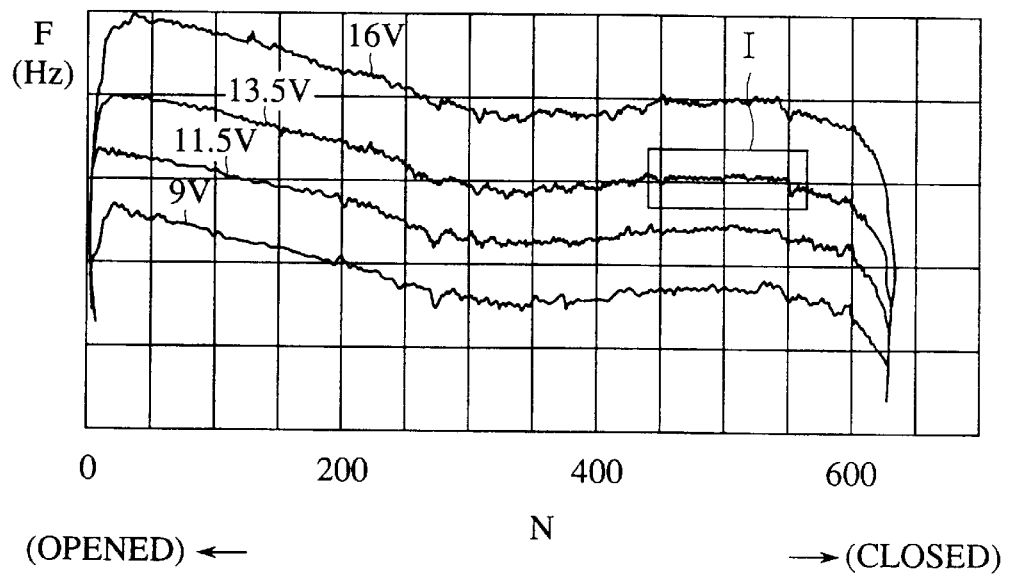
FIG. 6A shows the relation of the number of pulses and pulse frequency of pulse signal issued from the encoder in the ascending motion of the vehicle window.
Figure 6B:
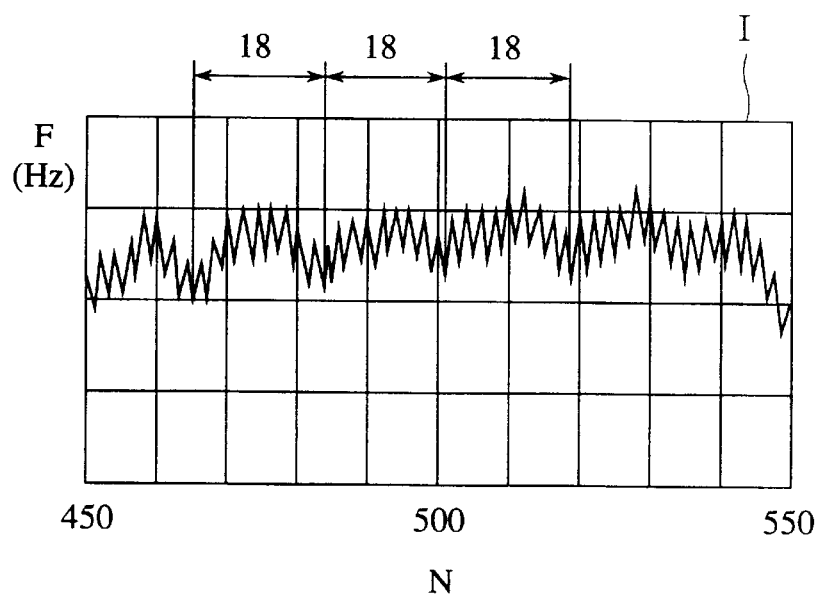
FIG. 6B is a magnified view of waveform (I) shown in FIG. 6A.

Referring now to FIG. 6A and FIG. 6B, features of frequency components of pulse signal issued from the encoder 9 are described below.

FIG. 6A shows the relation between the number of pulses N and pulse frequency F of pulse signal issued from the encoder 9 in the ascending motion of the vehicle window 27.

As shown in FIG. 6A, the pulse signal issued from the encoder 9 in the ascending process of the vehicle window 27 change in the pulse frequency depending on the supply voltage (9 V, 11.5V, 13.5 V, 16 V) of the battery 3 applied to the regulator motor 7.

Further as the waveform (I) in FIG. 6A is magnified, as shown in FIG. 6B, in frequency components of pulse signal, low frequency variation components are superposed to dislocate one in every "a" pulses, for example, 18 pulses. In FIG. 6B, too, the axis of abscissas denotes the number of pulses N, and the axis of ordinates represents the pulse frequency F.

According to the investigation of the present inventor, it is known because, while the vehicle window 27 is ascending or descending, the load applied to the engagement parts of the pinion gear 21 for transmitting the rotation of the regulator motor 7, and the sector gear 28 for rotating the main arm for driving up or down the vehicle window 27 is detected as a pulse signal fluctuating periodically, by the encoder 9 which is mounted on the regulator motor 7.

Therefore, so as to cancel such characteristic frequency variations in the engagement portions of the pinion gear 21 and sector gear 28, it can be understood enough to subtract the present frequency from the frequency of the pulse signal before the number of pulses corresponding to the period of one engagement of the pinion gear 21 and sector gear 28.

Figure 7:
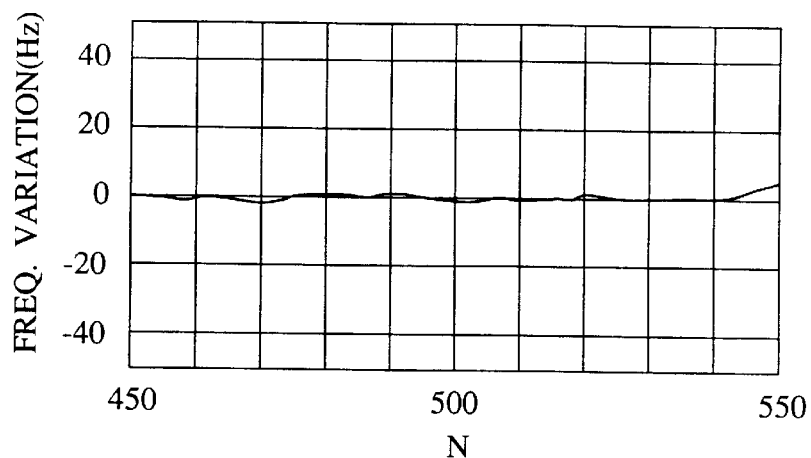
FIG. 7 shows result of canceling frequency variation generated as fluctuated manner in FIG. 6B.

FIG. 7 shows the result of canceling frequency fluctuations by such technique. In FIG. 7, the axis of abscissas shows the number of pulses N, and the axis of ordinates indicates fluctuation components of the frequency after canceling frequency fluctuations, as described FREQ VARIATION.

Referring to FIG. 7, it can be understood that frequency fluctuation components are substantially eliminated.

Referring now to the flowchart in FIG. 8, the closing drive operation of the vehicle window 27 of the vehicle power window control apparatus 1 in the embodiment is described below.

Herein, the contact state of the switches SWA, SWB in FIG. 1 are supposed to be in open state.

The control signal to be entered in the transistors Tr1, Tr2 is supposed to be in low state.

The vehicle window is supposed to be in fully open state.

The CPU 13 detects the contact state of the main switch 5, when the contact U of switch SWB is changed between closed state and open state, and when the contact of switch SWA is changed between closed state and open state.

The CPU 13 further samples pulse signal issued from the encoder 9 attached to the regulator motor 7, and calculates the pulse width $T_n$ from the rise period of input pulse signal to next rise period, and the CPU 13 also calculates the frequency $F_n$ which is an inverse number of the result of this calculation, and stores it, together with the counting value of pulse signal sequentially in the internal RAM of the CPU 13. Herein, n is a positive integer of 1 or more.

Suppose the main switch 5 provided in the door is pulled backward sufficiently by the vehicle driver, and is then released from hand and returned to the initial position. That is, the contact U of the switch SWB is closed, and the switch SWA is closed, and then both switches are opened again.

At this time, the CPU 13 judges that the one-touch function for raising the vehicle window continuously has been manipulated, and sets the close control flag at "1" and issues a close control signal of the high level to the base of the transistor Tr1.

Consequently, the transistor Tr1 is turned on according to the close control signal of the high level issued from the CPU 13. As a result, the collector and emitter of the transistor Tr1 conduct, and the coil of the relay 1 is excited, and the contact is changed over from the ground side to the power source side. The current from the battery 3 is fed into one end 7a of the regulator motor 7 through the contact of the relay 1, and is connected to the ground through the contact of the relay 2 from other end 7b of the regulator motor 7.

As a result, a driving current flows in the regulator motor 7 from terminal 7a to terminal 7b, and the vehicle window is changed over from the fully open state to an ascending state, and the vehicle window 27 ascends from down to up.

Figure 8:
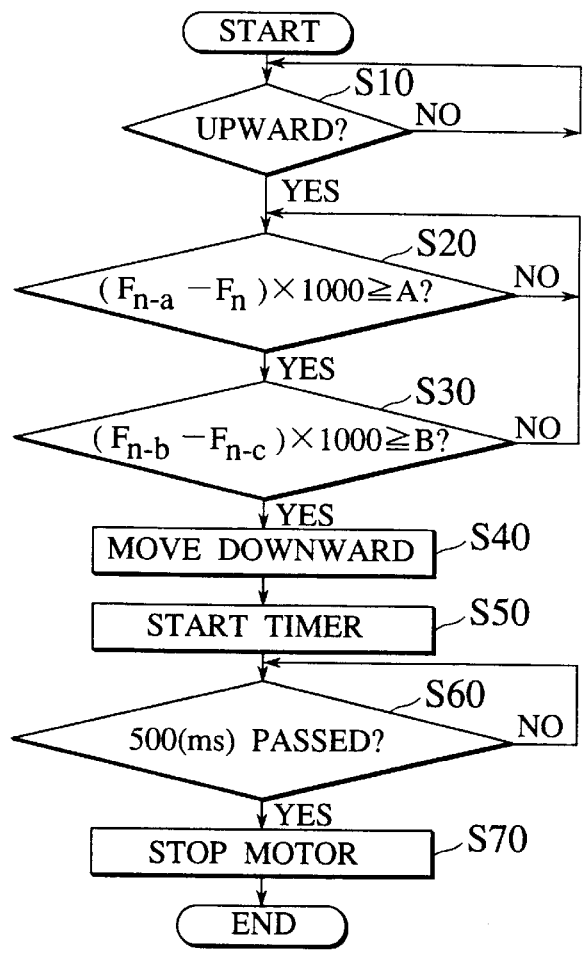
FIG. 8 is a flowchart for explaining the operation of the vehicle power window control apparatus.

First, in FIG. 8, at step S10, the CPU 13 judges if the vehicle window is ascending or not, as described UPWARD?.

Specifically, when the close control flag is set at "1" and pulse signal are issued from the encoder 9, it is judged that the vehicle window is ascending.

While the vehicle window is ascending, the process advances to step S20.

On the other hand, while the vehicle window is descending or stopped, the process goes back to step S10, and this operation is repeated.

At step S20, the CPU 13 processes as follows, regarding the frequency $F_n$ of the pulse signal issued from the encoder 9 attached to the regulator motor 7.

That is, the frequency $F_{n-a}$ is subtracted by the present frequency $F_n$. Here, the frequency $F_{n-a}$ is a previous one to the present frequency $F_n$ by the number of pulses "a" of the portion corresponding to one period of engagement of the pinion gear 21 and sector gear 28, and the product of this result multiplied by the coefficient is judged if equal to or larger than the reference value A, for example, 25 or not, according to the formula (1) as shown below.

$$(F_{n-a}-F_n) \times 1000 \geq A \tag{1}$$

In this formula, on the basis of the present number of pulses n, the previous frequency $F_{n-a}$ of the pulse signal is subtracted by the present frequency $F_n$ of the pulse signal and the frequency $F_{n-a}$ is previous one to the present number of pulses n by the number of pulses "a" corresponding to one period of engagement of the pinion gear 21 and sector gear 28, and therefore, substantially, frequency variation generated as fluctuated manner due to load applied to the engaging parts are canceled.

When the formula (1) is established, the process advances to step S30.

If the formula (1) is not established, the process returns to step S20, and the same operation is repeated.

At step S30, the frequency $F_{n-b}$ of number of pulses b before the present is subtracted by the frequency $F_{n-c}$ of number of pulses c before the present, and the product of this result multiplied by the coefficient is judged if equal to or more than the reference value B, for example, 5 or not, according to formula (2).

$$(F_{n-b}-F_{n-c}) \times 1000 \geq B \tag{2}$$

Between integers b and c, there is a relation of holding the number of pulses "a" corresponding to one period of engagement of the pinion gear 21 and sector gear 28. That is, the relation is b−c=a.

Therefore, the formula (2) is the formula of judging change of frequency components on the basis of a point before the present number of pulses n by number of pulses c.

In this formula, on the basis of the number of pulses n−c before the present number of pulses n by number of pulses c, the frequency $F_{n-b}$, that is previous to the frequency $F_{n-c}$ by the number of pulses "a" corresponding to one period of engagement of the pinion gear 21 and sector gear 28, is subtracted by the frequency $F_{n-c}$, and therefore, substantially, frequency variation generated as fluctuated manner due to load applied to the engaging parts are canceled.

When the formula (2) is established, the process advances to step S40.

If the formula (2) is not established, the process returns to step S20, and the same operation is repeated.

Processing results explained at step S20 and S30 are described below while referring to FIG. 9 and FIG. 10.

In these diagrams, the axis of abscissas denotes the number of pulses N of pulse signal, and the axis of ordinates represents the frequency f.

Also in the diagrams, the solid line corresponds to subtraction, on the basis of the present number of pulses n, of frequency $F_n$ of the pulse signal of the present number of pulses n from the frequency $F_{n-a}$ of the pulse signal previous to the frequency $F_n$ by the number of pulses "a" corresponding to one period of engagement of pinion gear 21 and sector gear 28.

On the other hand, the dashed line corresponds to subtraction, on the basis of the number of pulses n–c before the present number of pulses n by number of pulses c. of the frequency $F_{n-c}$ of the pulse signal before the present number of pulses n by the number of pulses c from the frequency $F_{n-b}$ of the pulse signal previous to the frequency $F_{n-c}$ by the number of pulses "a" corresponding to one period of engagement of the pinion gear 21 and sector gear 28.

While the vehicle is running a rough road, suppose the driver manipulates the switch to raise the vehicle window 27 in order to avoid admission of rain or dust into the vehicle.

Figure 9A:
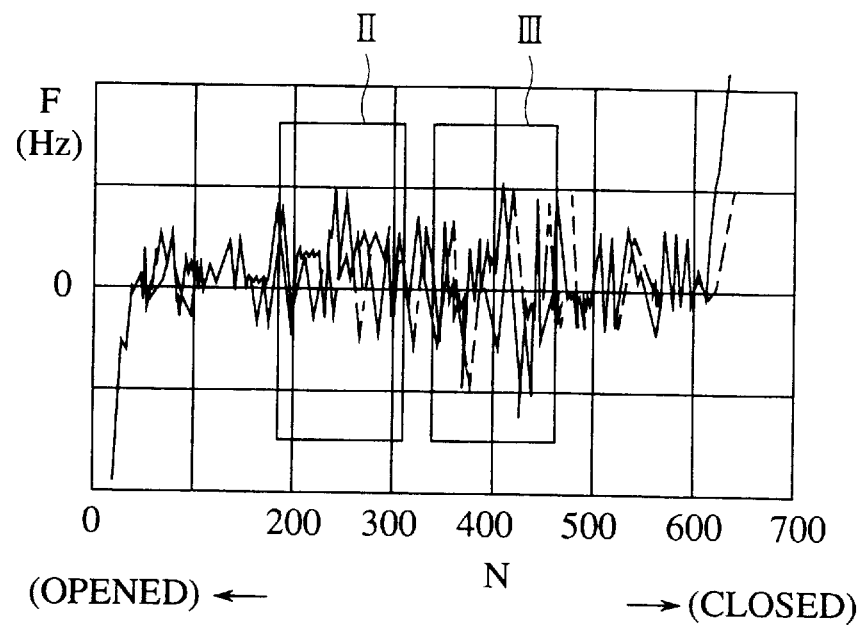
FIG. 9A is a drawing showing frequency fluctuations of pulse signal issued from the encoder while running a rough road.

In this case, vibrations due to rough road are applied to the engaging portions of the pinion gear 21 and sector gear 28, and an extreme frequency fluctuations as shown in FIG. 9A occurs in the frequency F of pulse signal issued from the encoder 9.

Figure 9B:
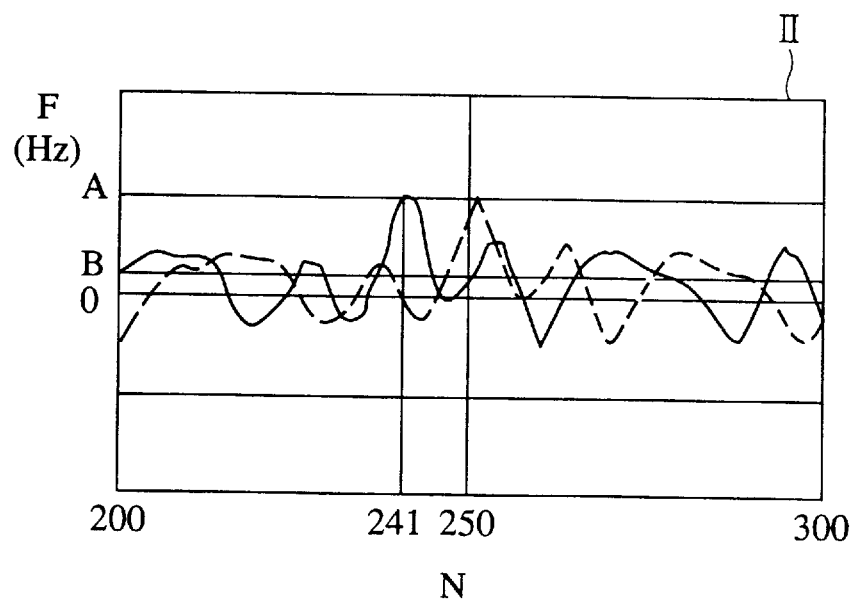
FIG. 9B is a magnified view of waveform (II) shown in FIG. 9A.
Figure 10A:
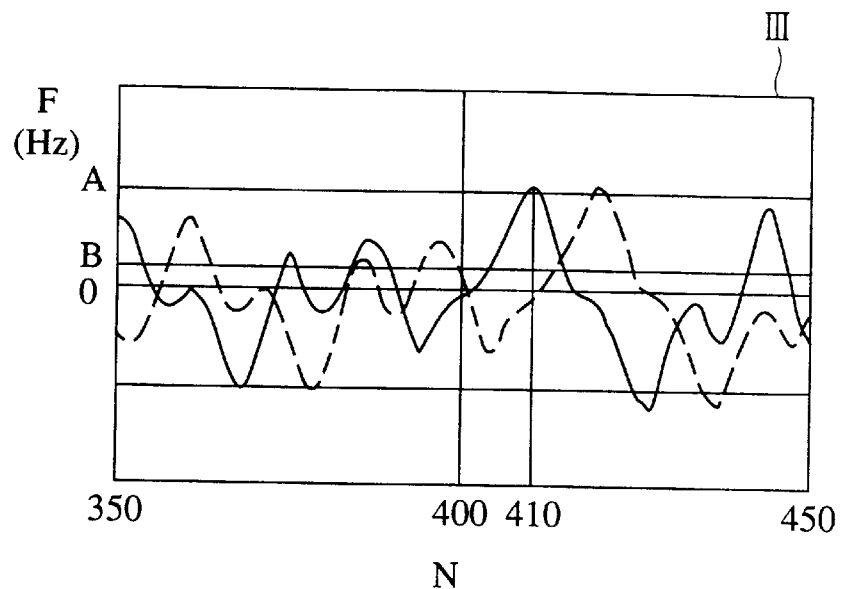
FIG. 10A is a magnified view of waveform (III) shown in FIG. 9A.

Magnified views of regions (II), (III) in FIG. 9A are shown in FIG. 9B and FIG. 10A, respectively.

As shown in FIG. 9B, when counting value N of pulse signal is in a range of 200 to 300, the value obtained from the left side of the formula (1) establishes the formula (1) only when the counting value N of pulse signal becomes 241.

On the other hand, the value obtained from the left side of the formula (2) establishes the formula (2) at various points.

However, when the formula (1) is established, the formula (2) is not established at the same time.

Therefore, the CPU 13 repeats the operation from step S20 to S30.

Next, as shown in FIG. 10A, when the counting value N of pulse signal is in a range of 350 to 450, the value obtained from the left side of the formula (1) establishes the formula (1) only when the counting value N of pulse signal becomes 410.

On the other hand, the value obtained from the left side of the formula (2) establishes the formula (2) at various points.

However, when the formula (1) is established, the formula (2) is not established at the same time.

Therefore, in this case too, the CPU 13 repeats the operation from step S20 to S30.

Figure 10B:
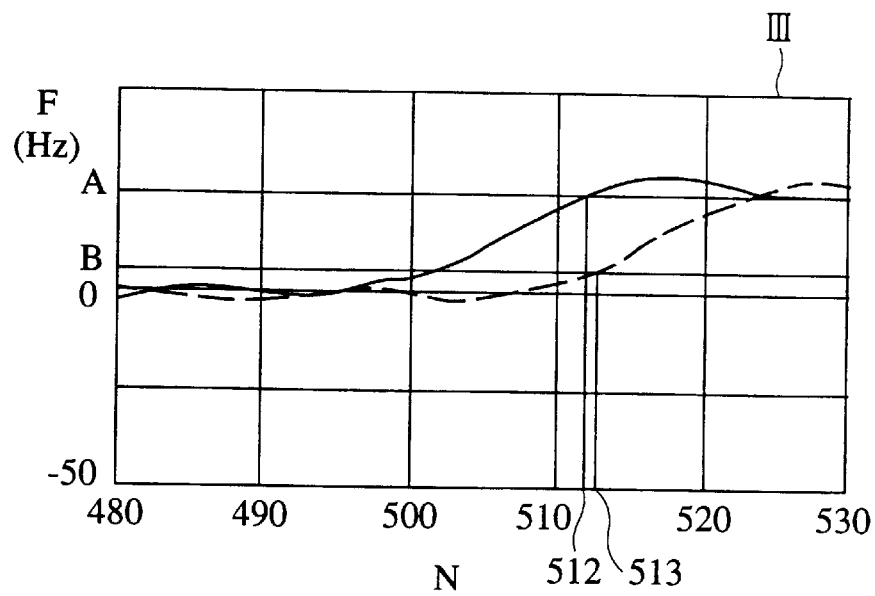
FIG. 10B is a drawing for explaining judgement of foreign matter inclusion.

Or, as shown in FIG. 10B, when the counting value N of pulse signal is in a range of 480 to 530, the value obtained from the left side of the formula (1) establishes the formula (1) when the counting value N of pulse signal is in a range of 513 to 530.

On the other hand, the value obtained from the left side of the formula (2) establishes the formula (2) when the counting value N of pulse signal is in a range of 512 to 530.

As a result, when the formula (1) is established, the formula (2) is established at the same time when the counting value N becomes 513, and this time it is judged that a foreign matter is caught by the vehicle window 27 in its ascending motion.

Consequently, the operation of the CPU 13 advances to step S40.

Thus, in this embodiment, first, the rotational angle of the regulator motor 7 is converted into the pulse signal by the encoder 9, and using the formula (1) and formula (2), the difference in frequency of pulse signal is calculated while canceling fluctuations of pulse signal occurring due to engagement of the pinion gear 21 for transmitting the rotation of the regulator motor 7, and the sector gear 28 for driving up or down the vehicle window 27.

Next, when the difference in frequency calculated by using the formula (1) and formula (2) is equal to or exceeds the specified reference values in both cases, it is judged that foreign matter is caught in the vehicle window 27.

In this embodiment, therefore, since the "foreign matter caught" by the vehicle window 27 is judged while canceling fluctuations of pulse signal, the judging precision of the "foreign matter caught" is enhanced, and errors in detection of the "foreign matter caught" can be efficiently prevented.

Moreover, in the embodiment, for frequency components of pulse signal issued from the encoder 9, the difference in frequency is calculated by combining two formulas (1) and (2) differing in reference period, and the "foreign matter caught" by the vehicle window 27 is judged only when the formula (1) and formula (2) are established at the same time, so that the precision of judgement of the "foreign matter caught" can be further enhanced.

At step S40, in order to move the vehicle window 27 downward, the CPU 13 set the open control flag at "1" and issues an open control signal of high level to the base of the transistor Tr2.

As a result, the transistor Tr2 is turned on according to the open control signal of high level issued from the CPU 13, and the collector and emitter of the transistor Tr2 conduct, and the coil of the relay 2 is excited to change over the contact from the ground side to the power source side.

Consequently, the current from the battery 3 is fed into one end 7b of the regulator motor 7 through the contact of the relay 2, and is connected to the ground through the contact of the relay 1 from the other end 7a of the regulator motor 7.

As a result, a driving current flows in the regulator motor 7 from terminal 7b to terminal 7a, and the vehicle window 27 is changed over from the ascending state to a descending state, and the vehicle window 27 descends from up to down.

At step S50, the internal time of the CPU 13 is set to 0 and started.

At step S60, judging if a specified time, for example, 500 (ms) is passed or not, and when 500 (ms) is passed, the process advances to step S70.

If not passing 500 (ms), the process returns to step S60, and the same operation is repeated.

At step S70, so as to stop descending of the vehicle window 27, the CPU 13 set the open control flag to "0," and issues a stop control signal of low level to the base of the transistor Tr2.

Herein, the transistor Tr2 is turned off according to the stop control signal of low level issued from the CPU 13, and the collector of the transistor Tr2 is opened, and the excited state of the coil of the relay 2 is canceled, so that the contact is changed over from the power source side to the ground side.

In consequence, the driving current being so far supplied into the regulator motor 7 is lost, and the vehicle window is changed over from the descending state to a stopped state, the included state is canceled, and the vehicle window 27 is maintained in a slightly open state.

This ends a series of the operation in this embodiment.

Furthermore, after the foreign matter is removed from the vehicle window 27 by the driver, if desired to close the vehicle window 27 fully, the main switch 5 is pulled somewhat backward to close the contact U of the switch SWB, and this state is continued until the vehicle window 27 ascends to the end.

The CPU 13 detects the contact state of the main switch 5 where the contact U of the switch SWB has been closed. Herein, the CPU 13 judged manipulation of manual function, and sets the close control flag to "1" and issues a close control signal of high level to the base of the transistor Tr1.

The transistor Tr1 is turned on according to the close control signal of high level issued from the CPU 13, and the collector and emitter of the transistor Tr1 conduct, the coil of the relay 1 is excited, and the contact is changed over from the ground side to the power source side.

Consequently, the current from the battery 3 is fed into one end 7*a* of the regulator motor 7 through the contact of the relay 1, and is connected to the ground through the contact of the relay 2 from other end 7*b* of the regulator motor 7.

As a result, a driving current flows in the regulator motor 7 from terminal 7*a* to terminal 7*b*, and the vehicle window 27 is changed over from the stopped state to an ascending state, and the vehicle window 27 ascends from down to up, and is then fully closed.

In the embodiment, the X-arm type mechanism is explained, but not limited to this, it may be similarly applied when using any mechanism comprising at least two gears for driving up or down the vehicle window and a motor.

What is claimed is:

1. A power window control apparatus for controlling ascending or descending drive of an opening and closing body, comprising:

a first gear transmitting rotation of a motor;

a second gear provided so as to drive up and down said opening and closing body;

an encoder converting a rotational angle of said motor into a pulse signal;

calculating means calculating a frequency value of said pulse signal so as to cancel fluctuations of said pulse signal due to engagement of said first gear and said second gear, and; and judging means judging that a foreign matter is caught by said opening and closing body in the case that said frequency value, calculated by said calculated means is equal to or exceeds a predetermined reference value.

2. A power window control apparatus according to claim 1, wherein said calculating means calculates said frequency value of said pulse signal by subtracting a present frequency of said pulse signal from a frequency of said pulse signal previous to said present frequency by the portion of one period of engagement of said first gear and said second gear.

3. A power window control apparatus according to claim 1, wherein said calculating means calculates plural frequency values by combining plural formulas differing in each reference period with respect to a frequency of said pulse signal output from said encoder, and said judging means judges that said foreign matter is caught by said opening and closing body in the case that said plural formulas corresponding to said plural frequency values are established at the same time.

4. A power window control apparatus according to claim 1, further comprising an arm member rotatably supported, having one end thereof coupled to said opening and closing body, wherein said second gear is a sector gear coupled to the other end of said arm member.

5. A power window control apparatus according to claim 1, wherein said calculating means includes a noise canceler.

6. A power window control apparatus of claim 5, wherein said noise canceler cancels noise due to load fluctuations caused by engagement of said first gear and said second gear, by calculating a frequency value by subtracting a present frequency of said pulse signal from a frequency of said pulse signal previous to said present frequency by the portion of one period of engagement of said first gear and said second gear.

7. A power window control apparatus according to claim 6, wherein said noise canceler further calculates a frequency value of said pulse signal by subtracting a frequency of said pulse signal having a reference period different from that of said present frequency, from a frequency of said pulse signal previous to said frequency of said pulse signal having said reference period different from that of said present pulse signal by the portion of one period of engagement of said first gear and second gear, and said judging means judges that said foreign matter is caught by said opening and closing body by combining plural formulas on the basis of frequency values calculated by subtracting by mutually varying said reference period.

* * * * *